United States Patent Office 2,710,330
Patented June 7, 1955

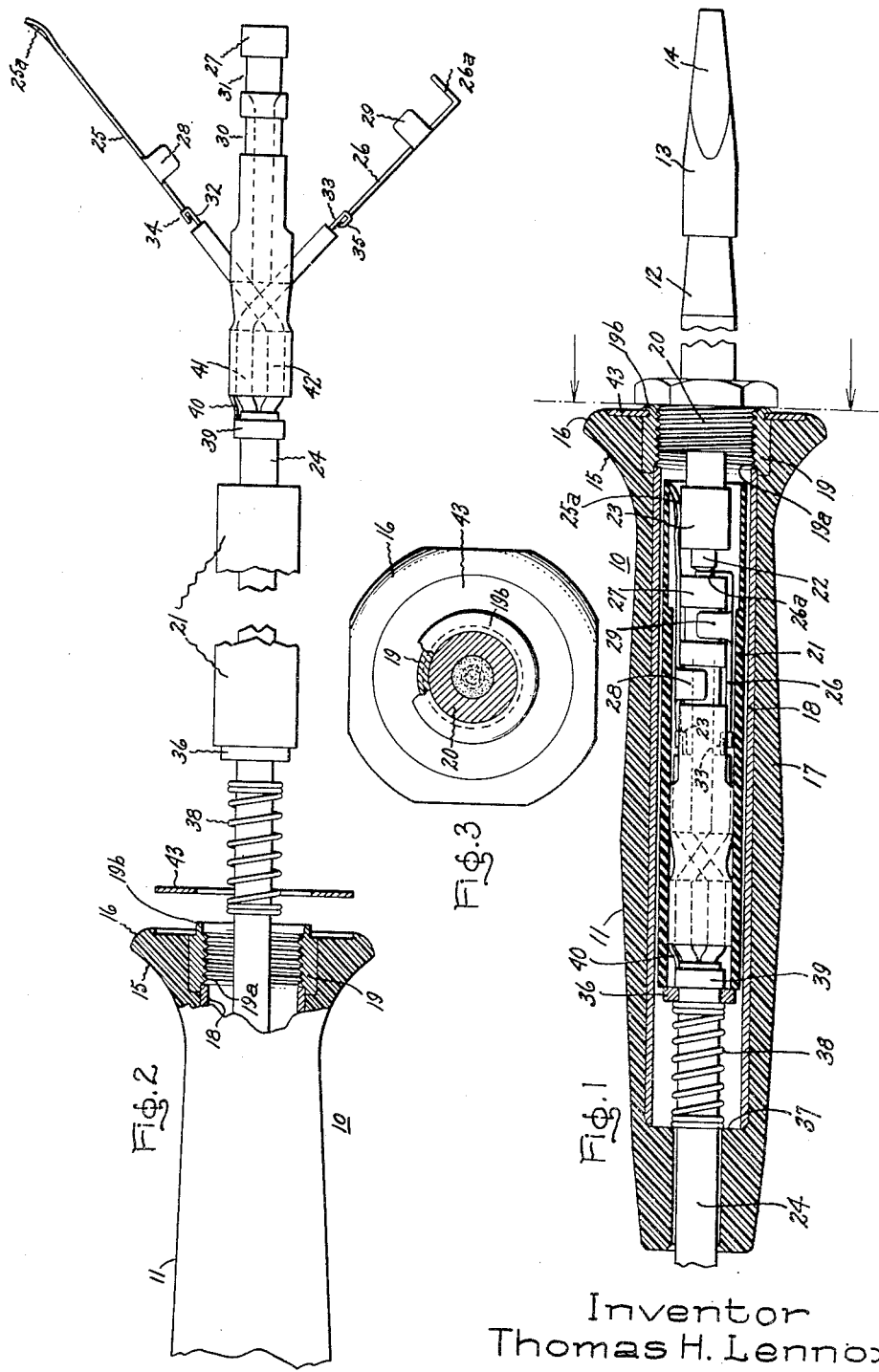

2,710,330

SOLDERING IRON HANDLE

Thomas H. Lennox, Pittsfield, Mass., assignor to General Electric Company, a corporation of New York Application September 25, 1951, Serial No. 248,120

4 Claims. (Cl. 219—26)

This invention relates to heating devices, and more particularly to electric soldering irons having detachable heating units. This invention is particularly useful with small soldering irons but it is not limited thereto and may be utilized with other heating devices if desired.

The general object of my invention is to provide an improved construction for soldering irons having detachable heating units.

A more specific object of the invention is the provision of an electric soldering iron having a heating unit which is detachable from the handle, in which the portion of the handle most closely adjacent the heating unit does not become uncomfortably hot, even under conditions of extended continuous operation.

A feature of the invention is the provision of a soldering iron which is so arranged and proportioned that if it is laid down on a flat horizontal surface the heated portion thereof is held out of contact with the surface.

Another feature of this invention is the provision of a soldering iron which is prevented from rolling when it is lying on a surface with the heated portion held away from the surface.

Further objects, features and advantages of my invention will be apparent from an examination of the subsequent detailed description of a preferred embodiment of the invention in conjunction with the accompanying drawing while the scope of the invention is defined in the appended claims.

Prior to this invention, the problem of preventing the heating of the handles of soldering irons which must be used continuously for extended periods of time has been a difficult one, particularly with small soldering irons in which the handle and the heated portion of the iron are closely adjacent. Such heating occurs principally at the end of the handle adjacent the heating unit where the fingers normally contact the handle. Such handles are normally made of thermal insulating material but this alone ordinarily is not sufficient to prevent uncomfortable heating at the heating unit end of the handle in the event of extended continuous operation. Attempts have been made to insulate or shield the heating unit from the handle in such a way as to prevent the flow of heat from the heating unit to the handle. The effect of this, however, in most cases is merely to introduce a delay in such heat flow, and if the soldering iron is operated for an extended period enough heat ultimately passes into the handle to build up an uncomfortable temperature at the end adjacent the heating unit.

In carrying out this invention in one form, I provide, for soldering iron having a detachable tip and heating unit, a handle made of a molded plastic material which has a metal tube molded on the inside of the handle. The soldering iron is so arranged that this tube is in contact with the heating unit, and this tube therefore conducts heat away from the end of the handle adjacent the heating unit. This raises the temperature of the entire handle slightly but it prevents the temperature of the end of the handle next to the heating unit from increasing to an uncomfortable degree. This tube may also act as a counterweight in conjunction with a flange on the end of the handle adjacent the heating unit, enabling the operator to lay the soldering iron on a flat horizontal surface with the soldering tip held out of contact with the surface. In order to prevent the soldering iron rolling when it is so placed on a surface, the flange may be made irregular in configuration.

For a clearer and more complete understanding of my invention, reference should be had to the accompanying drawing in which Fig. 1 is an elevation view with the handle in section of a soldering iron embodying this invention, Fig. 2 is a partial exploded view showing the soldering iron of Fig. 1 partially assembled, while Fig. 3 is a view along the line 3—3 of Fig. 1 showing the configuration of the flange on the soldering iron handle.

There is shown in Fig. 1 of the drawing a soldering iron 10 which embodies the present invention. This soldering iron comprises a handle 11 and a detachable heating unit 12 having one end extending into handle 11. The heating unit 12 is preferably of the sheathed type having an electrical resistance wire embedded within a heat refractory electrical insulating material, such as compacted magnesium oxide powder, which is surrounded by an outer metal sheath. One heating unit which is suitable for this purpose is the concentrically constructed type shown in my Patent 2,515,781, issued July 18, 1950, which is assigned to the same assignee as the present application. A soldering tip 13 may be mounted on the opposite end of the heating unit in heat conducting relation therewith and this soldering tip may be provided with one or more soldering surfaces such as the surface indicated by the numeral 14 in Fig. 1.

All three figures of the accompanying drawing are enlarged, and the handle 11 of the soldering iron is normally made of a size suitable for the human hand. Only a portion of the heating unit 12 is shown in Fig. 1 but in the ordinary case for small soldering irons this heating unit together with the soldering tip 13 is approximately the same length as the handle 11. This invention is particularly adaptable for use in small soldering irons, and with such soldering irons it is customary for the operator when using the soldering iron to hold the handle 11 in a manner such that his finger tips engage a curved portion 15 of the handle forming a part of a flange 16 at the end of the handle adjacent the heating unit.

The handle 11 comprises an outer hollow member 17 on which both the outer and inner surfaces may be of circular cross section. Member 17 is of thermal insulating material with a tube 18 of metal or other good heat conductive material positioned immediately inside the inner surface of member 18 in intimate heat conducting relation with this surface and extending a substantial portion of the full length of the handle. Tube 18 is connected to an internally-threaded metal bushing 19 which is positioned at the heating unit end of the handle. As shown, the handle may include a metal face plate 43 which is held in position at the end of the handle by a spun over projection 19b on bushing 19. The internal threads 19a on bushing 19 engage corresponding external threads 20 on heating unit 12 and thus detachably connect the heating unit to the handle. The threads and bushing 19 also provide a path by which heat from heating unit 12 is conducted to tubular member 18. Member 18 conducts this heat to more remote portions of the handle and thus increases the temperature of the outer surface of the entire handle slightly. Such a slight increase in temperature is not objectionable, however, and this arrangement prevents an objectionable accumulation of heat at the heating unit end of the handle, thereby making a soldering iron embodying this arrangement much more acceptable to the operator. It will be understood, of course, that the heating unit 12 should be, and invariably is, designed so that a maximum portion of the heat generated thereby is conducted to the soldering tip 13. It is not possible, however, to prevent a small portion of the heat from being transmitted to the handle end of the heating unit, and this invention provides for the disposition of this small portion of the heat in a simple and effective manner.

As illustrated in Figs. 1 and 2, the handle 11 includes within metal tube 18 a tube 21 of insulating material which houses the electrical connections to the heating unit. The heating unit 12, may, for example, have a pair of circularly disposed terminals 22 and 23 similar to those illustrated in my Patent 2,515,781 which extend into the handle, the terminal 22 being connected to a center terminal conductor of the heating unit and the terminal 23 being connected to the sheath thereof, and the two terminals being insulated from each other. A two-conductor cable 24 may be brought into the handle through a suitable opening of reduced size in the end of the handle opposite the heating unit and the terminal 23 may be connected to one insulated conductor 32 of the conductors in this cable by means of an elongated resilient member 25 having a shoe portion 25a thereon for slidably engaging terminal 23. The other terminal 22 may be connected to the second insulated conductor 33 of the cable 24 through a second resilient member 26 having a right angle portion 26a thereon against which terminal 22 abuts. As shown, the resilient members 25 and 26 are positioned in interfitting engagement with an insulating member 27 having suitable cut out portions for these members and for insulated conductors 32 and 33. Members 25 and 26 are provided with suitable projections 28 and 29 respectively which engage the bottom surfaces of recesses 30 and 31 provided therefore in member 27; although only single projections 28 and 29 are visible on the drawing there is preferably a pair of projections on each resilient member engaging opposite sides of insulating core member 27 to provide a solid structure. The two insulated conductors 32 and 33 extend from cable 24 through suitable openings 42 and 41 respectively in the left end of member 27 and are connected to resilient members 25 and 26 respectively at locations 34 and 35 after being crossed to aid in strain relief on the connections. The assembly comprising insulating member 27, resilient members 25 and 26, and portions of conductors 32 and 33 is snugly positioned within insulating tubular member 21; member 27 is of such diameter that it fits closely within member 21 and resilient members 25 and 26 are of such dimensions that they also fit tightly within member 27, resilient member 25 particularly and the shoe portion 25a on the end thereof being arranged so that they must be forced into insulating tube 21 in order to provide a tight fit. At the left of member 21 a washer 36 is provided, and between this washer and a shoulder portion 37 inside handle 11 there is provided a compression spring 38 to absorb a portion of the strain on the electrical connections within the handle caused by tension on cable 24. Between washer 36 and the left end of insulating member 27 there is provided a strain relief connection comprising a collar 39 which is clamped on to the outer surface of cable 24 and a projection 40 from collar 39 which extends into a corresponding opening in member 27.

In manufacturing the soldering iron, metal tube 18 is preferably molded into insulating member 17 in order to provide intimate contact between these two members. Bushing 19 is then added to the handle and connected to the tube 18, which may for example be made of copper, in a suitable manner such as by brazing to provide a good heat conducting joint between the two. At this time bushing 19 has the form illustrated in Fig. 2. Face plate 43 is then put in place at the end of handle 11 and the projecting ferrule 19b on bushing 19 is spun over to hold face plate 43 in position. In assembling the connections in the handle, cable 24 is first pulled through the handle and then spring 38, washer 36 and insulating tube 21 are slipped over the end of the cable. Then the two individual conductors 32 and 33 are passed through the openings 41 and 42 in member 27, crossed, and connected to resilient members 25 and 26 respectively at 34 and 35 in a suitable manner such as by soft soldering. The parts will then be approximately in the arrangement shown in Fig. 2 except for the bushing 19 and face plate 43 which will be already in their final position as shown in Fig. 1. Thereafter, member 27 together with resilient members 25 and 26 are slipped inside member 21 and the latter is slid inside the metal tube 18 within the handle. Then a heating unit 12 may be screwed into the bushing 19 in the handle, automatically making connections between terminals 22 and 23 of the heating unit and the two cable conductors.

If the metal tube 18 and the other parts of the handle 11 are made sufficiently heavy in comparison to the heating unit 12 and soldering tip 13, and have a properly located center of gravity, a soldering iron will be formed which may be laid on a flat horizontal surface even when energized. That is, if the handle end is made sufficiently heavy to overbalance the other end about the flange 16 as a pivot the soldering iron will lie on the surface with the heating unit and soldering tip raised in the air an amount depending upon the proportions of the soldering iron. The flange 16 is preferably made irregular in shape as illustrated in Fig. 3 of the drawing in order to prevent the soldering iron rolling when it is laid on a horizontal surface in this manner.

In one typical soldering iron embodying this invention in which the handle was approximately 5⅛″ in length and the overall length of the soldering iron was approximately 10⁵⁄₁₆″, which soldering iron had a heating unit rated 60 watts at 115 volts, I found that the presence of tube 18 molded in a plastic thermal insulating member 17 reduced the finger tip temperature at location 15 on the handle from approximately 145° F. to approximately 105° F. At the same time, the temperature of the remainder of the handle was raised slightly but not sufficiently to affect the comfortable use of the soldering iron.

While I have illustrated and described my invention in a preferred form thereof, modifications may be made by those skilled in the art, and it should be understood, therefore, that I intend to cover by the appended claims any such modifications which fall within the true spirit and scope of my invention.

What I claim as new and desire to secure by Letters Patent of the United States is:

1. A soldering iron comprising an elongated hollow handle of thermal insulating material, an external flange portion on one end of said handle, an elongated metal sheathed heating unit having a detachable connection with the flange end of said handle and having a portion thereof extending into said handle, a soldering tip mounted on the projecting end of said heating unit, at least one terminal on the portion of said heating unit extending into said handle for making an electrical connection to said heating unit, a tube of metal within said handle extending a substantial portion of its length from the flange portion thereof in intimate contact with the inner surface of the thermal insulating material thereof, said tube being connected in heat conducting relationship with said heating unit at the point where said heating unit is detachably connected with the flange end of said handle whereby said tube conducts heat from said heating unit away from the flange end of said handle and thereby equalizes the temperature of the outer surface of said handle, and means within said handle for terminating an electrical cable and connecting a conductor thereof to said heating unit terminal, the foregoing parts of the soldering iron being so proportioned and arranged that said tube acting as a counterweight in said handle overbalances the heating unit and soldering tip about said flange as a pivot when the soldering iron is lying on a flat horizontal surface.

2. A soldering iron comprising, an elongated hollow handle of thermal insulating material, an irregular external flange portion near one end of said handle, an internally threaded metal insert at the flange end of said handle, an elongated sheathed heating unit having an externally threaded portion for engaging said internally threaded metal insert and thereby detachably connecting said heating unit to said handle with a portion thereof extending into the handle, a soldering tip mounted on the projecting end of said heating unit, a pair of terminals on the portion of the heating unit extending into the handle for making electrical connections to said heating unit, a tube of metal within said handle extending a substantial portion of the length thereof in intimate contact with the inner surface of the thermal insulating material, said tube being in contact with said metal insert whereby it conducts heat from said heating unit away from the flange end of said handle and thereby equalizes the temperature of the outer surface of the handle, and means within said handle for terminating a two-conductor electrical cable and connecting said conductors respectively to the terminals of said heating unit, said means comprising a tube of insulating material within said metal tube, an insulating member fitting snugly within said insulating tube having cutout portions, a pair of flatly disposed resilient conductive members positioned in interfitting relation with said insulating member within said insulating tube, one said resilient member having a portion thereon for slidably engaging one of the terminals on said heating unit and the other resilient member having a portion thereon for engaging the other of said terminals in abutting relation, the foregoing parts of the soldering iron being so proportioned and arranged that the handle overbalances the heating unit and soldering tip about said flange as a pivot and maintains the soldering tip in elevated position when the soldering iron is lying on a flat horizontal surface.

3. A soldering iron comprising, an elongated hollow handle of thermal insulating material, an internally threaded metal insert at one end of said handle, an elongated metal sheathed heating unit having an externally threaded portion for engaging said internally threaded metal insert and thereby detachably connecting said heating unit to said handle with a portion thereof extending into said handle, a soldering tip mounted on the projecting end of said heating unit, a pair of terminals on the portion of said heating unit extending into said handle for making electrical connections to said heating unit, a tube of metal within said handle extending a substantial portion of the length thereof in intimate contact with the inner surface of the thermal insulating material of said handle, said tube being in heat conducting contact with said metal insert whereby it conducts heat from said heating unit away from said one end of said handle and thereby equalizes the temperature of the outer surface of said handle, and means within said handle for terminating a two-conductor electrical cable and connecting said conductors respectively to said terminals of said heating unit, said means comprising a tube of insulating material within said metal tube, an insulating member fitted snugly within said insulating tube and having cut out portions, a pair of flatly disposed resilient conductive members positioned in interfitting relation with said insulating member within said insulating tube, one said resilient member having a portion thereon for slidably engaging one of said terminals on said heating unit and the other of said resilient member having a portion thereof for engaging the other of said terminals in abutting relation.

4. A soldering iron comprising, an elongated hollow handle of thermal insulating material, an internally threaded metal insert at one end of said handle, an elongated metal sheathed heating unit having an externally threaded portion for engaging said internally threaded metal insert and thereby detachably connecting said heating unit to said handle with a portion thereof extending into said handle, a soldering tip mounted on the projecting end of said heating unit, at least one terminal on the portion of said heating unit extending into said handle for making an electrical connection to said heating unit, a tube of metal within said handle extending a substantial portion of the length thereof in intimate contact with the inner surface of the thermal insulating material of said handle, said tube being in heating conducting contact with said metal insert for conducting heat from said heating unit away from said one end of said handle to equalize the temperature of the outer surface of said handle, whereby said heating unit can be removed from said soldering iron at said metal insert independently of said tube thereby allowing said tube to be mounted in effective heat transfer relationship with said handle, and means within said handle for terminating an electrical cable and connecting a conductor thereof to said heating unit terminal.

References Cited in the file of this patent

UNITED STATES PATENTS

| | | |
|---|---|---|
| 237,123 | Park | Feb. 1, 1881 |
| 929,473 | Nilsson et al. | July 27, 1909 |
| 1,027,337 | Holmes | May 21, 1912 |
| 1,472,183 | MacFarland | Oct. 30, 1923 |
| 1,714,385 | Lofthouse | May 21, 1929 |
| 1,970,642 | Batchelder | Aug. 21, 1934 |
| 2,025,509 | Hieber | Dec. 24, 1935 |
| 2,184,980 | Smith | Dec. 26, 1939 |
| 2,491,165 | De Rugeris | Dec. 13, 1949 |
| 2,515,781 | Lennox | July 18, 1950 |
| 2,552,193 | Lennox | May 8, 1951 |
| 2,569,250 | Mims | Sept. 25, 1951 |
| 2,576,393 | Flanagan | Nov. 27, 1951 |